(12) United States Patent
Neal, III

(10) Patent No.: US 11,003,186 B1
(45) Date of Patent: May 11, 2021

(54) AUTOMATED ESCORT DRONE DEVICE, SYSTEM AND METHOD

(71) Applicant: Barron Associates, Inc., Charlottesville, VA (US)

(72) Inventor: David A. Neal, III, Charlottesville, VA (US)

(73) Assignee: Barron Associates, Inc., Charlottesville, VA (US)

( * ) Notice: Subject to any disclaimer, the term of this patent is extended or adjusted under 35 U.S.C. 154(b) by 0 days.

(21) Appl. No.: 17/110,517

(22) Filed: Dec. 3, 2020

Related U.S. Application Data

(60) Provisional application No. 62/966,717, filed on Jan. 28, 2020, provisional application No. 62/945,539, filed on Dec. 9, 2019.

(51) Int. Cl.
| | | |
|---|---|---|
| *G05D 1/00* | (2006.01) | |
| *H04N 5/232* | (2006.01) | |
| *G05D 1/10* | (2006.01) | |
| *H04N 7/18* | (2006.01) | |

(52) U.S. Cl.
CPC ......... *G05D 1/0094* (2013.01); *G05D 1/0038* (2013.01); *G05D 1/101* (2013.01); *H04N 5/23203* (2013.01); *H04N 7/185* (2013.01)

(58) Field of Classification Search
CPC .... G05D 1/0094; G05D 1/0038; G05D 1/101; H04N 5/23203; H04N 7/185
USPC ........................................................ 348/144
See application file for complete search history.

(56) References Cited

U.S. PATENT DOCUMENTS

| | | | |
|---|---|---|---|
| 2008/0167763 A1* | 7/2008 | Duranti | G05D 1/105 701/11 |
| 2017/0004662 A1* | 1/2017 | Gong | G05D 1/00 |
| 2017/0154536 A1* | 6/2017 | Kreiner | G06Q 10/00 |
| 2018/0033315 A1* | 2/2018 | Winkle | B64F 1/007 |
| 2018/0322749 A1* | 11/2018 | Kempel | G05D 1/0094 |
| 2020/0073385 A1* | 3/2020 | Jobanputra | G06F 9/547 |

* cited by examiner

*Primary Examiner* — Amir Shahnami
(74) *Attorney, Agent, or Firm* — Williams Mullen; Thomas F. Bergert

(57) ABSTRACT

Embodiments of an escort drone device, system and method provide one or more autonomous or semi-autonomous escort drones capable of being summoned by an individual to a first location, wherein the escort drone(s) includes a payload with threat deterring components and wherein the threat deterring components can be engaged by a remote operator at a different location from the first location. In embodiments, the system can employ intelligent mesh networking to allocate one or more escort drones to one or more specific locations.

21 Claims, 5 Drawing Sheets

AUTOMATED ESCORT DRONE DEVICE, SYSTEM AND METHOD

CROSS REFERENCE TO RELATED APPLICATIONS

The present application claims priority to U.S. provisional application No. 62/945,539, filed on Dec. 9, 2019 and U.S. provisional application No. 62/966,717, filed on Jan. 28, 2020, the contents of which are incorporated by reference herein in their entirety.

TECHNICAL FIELD

The present disclosure pertains to personal security, and more particularly to a drone device, system and method for rapid, real-time escort assistance for personal security.

BACKGROUND AND SUMMARY

Potentially hazardous or criminal activities can occur in a variety of locations and oftentimes without any surveillance such as captured video that may assist in identifying or capturing perpetrators. While fixed cameras exist in and around places of business and other public places, many communities have little or no surveillance infrastructure to assist in deterring or preventing undesirable and potentially hazardous or criminal behavior. For example, college campuses, public parking lots and other areas have certain risks of suspicious and potentially hazardous or criminal activity, particularly when an individual may be walking alone. Further, other outdoor arenas such as state and national parks, campgrounds, hiking trails and outdoor event sites may be prone to criminal or dangerous scenarios where threats may arise.

According to aspects of the present disclosure, an individual who feels his or her safety is threatened, or even the safety of another individual is threatened, can summon an escort drone to his or her location or another individual's location to provide a live video and/or audio feed and also deter criminal or potentially harmful activity with threat deterring devices such as flashing security lights, a spotlight and/or a loudspeaker, for example. An individual can also schedule an escort drone using the presently described system and method for accompaniment between multiple locations. The video feed from the escort drone can be actively monitored by a remote security operator who can respond in a multitude of ways to an escalating threat. Further, the system and method as described herein can enable community members to self-police their communities by acting as remote security operators for other community members. In such exemplary ways and as described herein, the system, device and method disclosed can provide "on-call" personal security for individuals in perceived threat scenarios that might or might not constitute a true, immediate emergency.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can incorporate a controller having a processor and an associated memory storing instructions that, when executed by the processor, cause the processor to perform operations as described herein. It will be appreciated that reference to "a", "an" or other indefinite article in the present disclosure encompasses one or more than one of the described element. Thus, for example, reference to a processor encompasses one or more processors, reference to a drone enclosure encompasses one or more drone enclosures, reference to an escort drone encompasses one or more escort drones and so forth.

Figure 1:
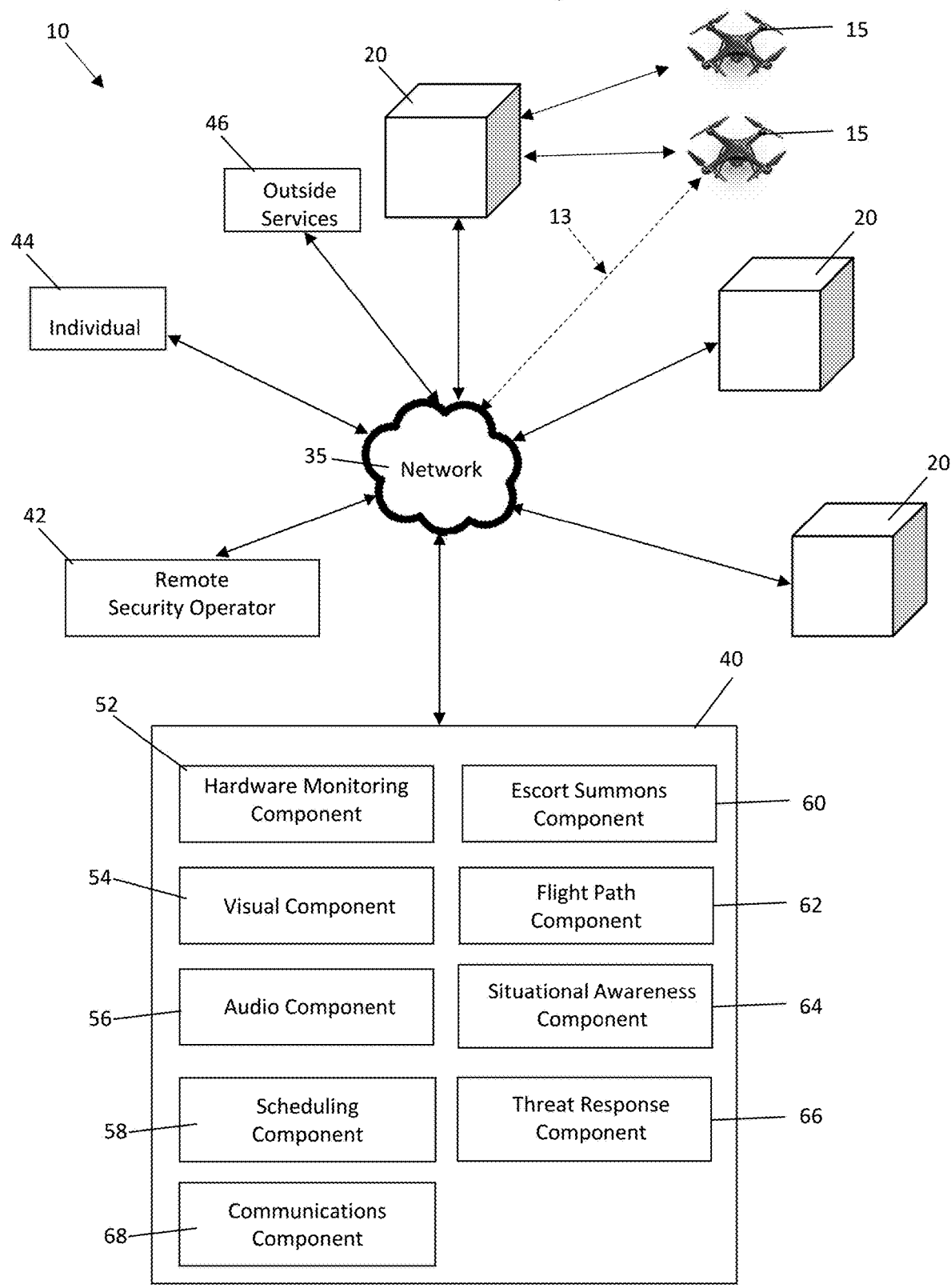
FIG. 1 is an exemplary schematic diagram of a system in accordance with embodiments of the present disclosure.
Figure 2:
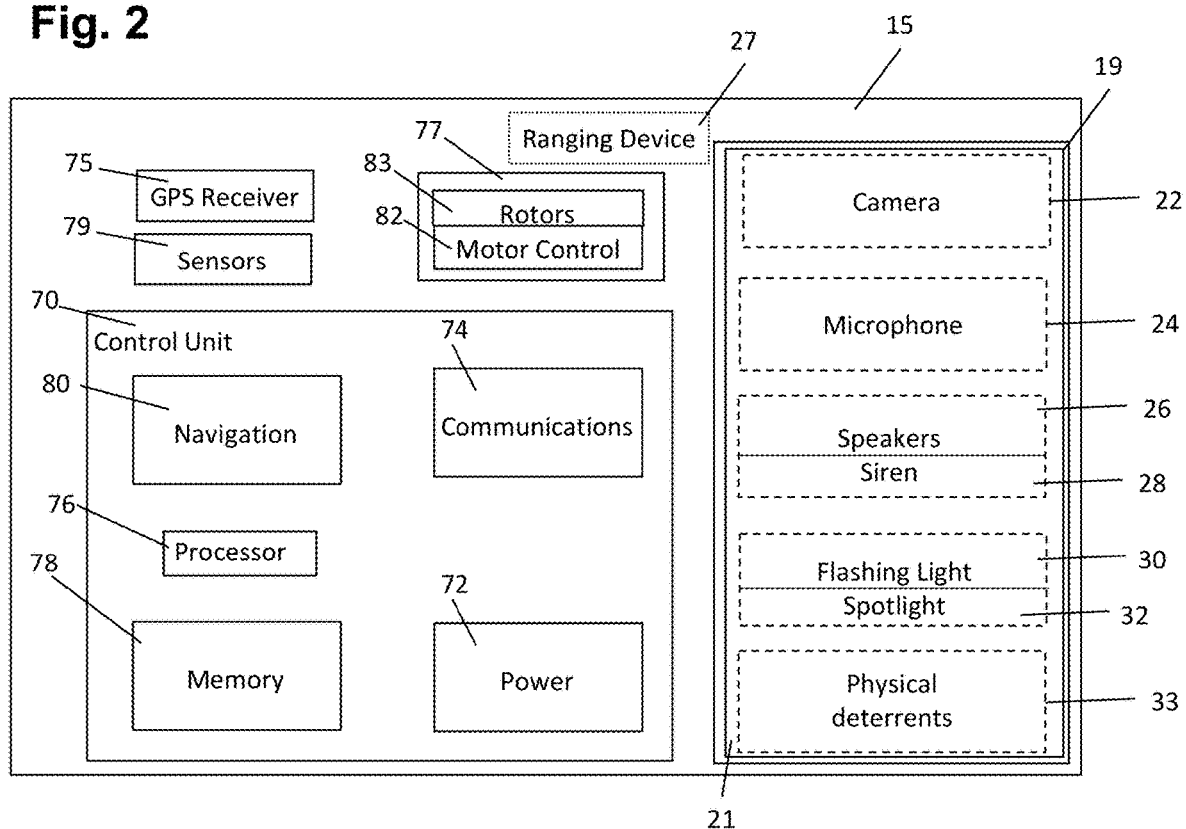
FIG. 2 is a block diagram of components of an escort drone according to embodiments of the present disclosure.

As shown in FIGS. 1 and 2, embodiments of the present disclosure include a system 10 for on-call personal security employing one or more escort drones 15 and one or more drone enclosures 20. In various embodiments, each escort drone 15 can be equipped with a camera 22, microphone 24, speaker 26, flashing security light 30, siren 28, and spotlight 32. In some embodiments, escort drone(s) 15 are equipped with physical deterrents 33 such as pepper spray, animal deterrent spray, a taser or a taser dart, for example. All such elements can be considered examples of threat deterring devices 21 in accordance with the present disclosure. The camera 22 can provide a live video feed between an individual 44 summoning the escort drone 15 and a user such as a remote security operator (RSO) 42. The speaker 26 allows an RSO 42 to provide pre-recorded sound and/or live audio communication to an individual and/or an area where an individual is located, for example. The microphone 24 allows the individual to provide live audio communication to an RSO 42. The camera 22 and audio equipment allow an RSO 42 to rapidly ascertain situational awareness of the potential threat scenario, issue instructions and/or guidance, and determine whether emergency services need to be contacted. Furthermore, the audio-visual system can provide a recording of the scenario for future use by law enforcement and other entities.

The flashing security light 30 and siren 28 on the escort drone 15 can indicate emergency services. The flashing light 30 and siren 28 act as a deterrent to criminal activity and to notify others of the general emergency situation. The spotlight 32 can be aimed. For example, at night, the spotlight 32 can provide illumination of the individual 44 and scenario for improved visual evaluation and also to deter a potentially criminal or dangerous scenario.

With further reference to FIG. 1, the system 10 can provide a remote server 40 accessible over a network 35 by one or more RSOs 42, one or more individuals 44 and outside services 46. The remote server 40 can communicate with one or more escort drones 15 through one or more drone enclosures 20 via network 35, and in various embodiments can communicate directly with one or more escort drones 15 via network 35, as indicated by line 13. It will be appreciated that network 35 can be one or more networks including WiFi and cellular networks, for example. In instances where network 35 is a cellular network, escort drone(s) 15 are equipped with a suitable communications component such as a cellular modem, for example. The remote server 40 can include a remote server processor and a remote server memory storing instructions that when executed by the remote server processor perform functions and routines as described herein. For example, a hardware monitoring component 52 can operate to assess battery charge level, rotor operability and other operational aspects of one or more escort drones 15 and send appropriate alerts via communications component 68 in the event an escort drone 15 requires servicing or replacement. Visual component 54 provides programming enabling the RSO 42 to view captured images and/or video from camera 22 of an escort drone 15. Audio component 56 provides programming enabling the RSO 42 to hear sounds captured by microphone 24 of an escort drone 15 and further enabling the RSO 42 to communicate with an individual 44 via one or more microphones associated with an RSO device (e.g., 200 in FIG. 5). In this way, two-way communication between an RSO 42 and an individual 44 at a surveilled location can occur. Scheduling component 58 provides programming enabling an individual 44 to schedule an escort drone 15 in advance of a security or other need. For example, if an individual 44 is leaving a public establishment at a certain time of night to walk to the individual's vehicle, the individual 44 may schedule the escort drone 15 prior to the planned departure. Escort summons component 60 provides programming for receiving an escort drone request from an individual 44, initiating movement of the escort drone 15 to the individual's summoned location and toggling various components of the escort drone 15 on and off or to different settings as needed. For example, the flashing light 30 may be automatically deployed once an escort drone 15 is dispatched to an individual's location. In various embodiments, escort summons component 60 includes programming for determining which one of multiple escort drones 15 is most suitable for a given summons based upon the location, battery life and/or condition of escort drones 15 in a bank of escort drones 15.

Flight path component 62 provides programming for determining the optimal path of travel for an escort drone 15 to the individual's location. For example, the flight path component 62 can be programmed so as to avoid populated areas in the event the drone 15 may crash into one or more people. Alternatively, the flight path component 62 can be programmed to take the route to the individual's location which uses the least amount of battery power. Further, the flight path component 62 can be programmed to avoid obstacles such as buildings and trees using visual and/or ranging elements on the escort drone 15. Situational awareness component 64 can include programming for assessing the presence of security risks based on visual and auditory signals such as loud noises or screams, sprinting or other cues. Threat response component 66 can include programming for responding to actual or perceived threats that may or may not constitute a true emergency, including activating threat deterring devices such as the siren 28, speaker 26, spotlight 32 or physical deterrents 33 such as pepper spray, animal deterrent spray, a taser or a taser dart, for example. As described elsewhere herein, the camera 22 can provide a live video feed to the RSO 42 to rapidly ascertain situational awareness of the potential threat scenario. The loudspeaker 26 can allow an RSO 42 to provide real-time audio directives and deter threats. The flashing security light 30 and siren 28 can be used to indicate an emergency response to deter escalation of a perceived threat scenario. A gimballed spotlight 32 can be aimed to illuminate the region surrounding the individual 44 to provide a sense of security to the individual 44, for improved visual evaluation by the RSO 42, and also to deter escalation of a perceived threat scenario. Recordings of the camera and audio communications can be saved for distribution to outside services 46 such as law enforcement, for example. In various embodiments, the server 40 can communicate over network 35 with such outside services 46, whether autonomously based on programmed instructions that provoke such notifications based on perceived circumstances, or directly based upon instructions received via the RSO 42 or individual 44 involved. In some instances, the threat response component 66 can activate propulsion on the escort drone 15 to crash the escort drone 15 into an object or even a human at the surveilled scene. Such activation can be initiated by an RSO 42 or an individual 44, for example. It will be appreciated that actions described herein as available to be taken by an RSO 42 through a remote control unit 200 can also be taken by an individual 44 using an individual's mobile communications device in such instances where the individual's mobile communications device is appropriately equipped.

With further reference to FIG. 2, the escort drone 15 can include a control unit 70 having provisioning for power 72 such as a battery, and a communications component 74 such as a radio for receiving signals from a drone enclosure 20, for example. The escort drone control unit 70 is further provided with a processor 76 (also called escort drone processor) and a memory 78 (also called escort drone memory) storing instructions that when executed by the processor perform functions and routines as described herein. For example, navigation programming 80 can be provided on the escort drone 15 enabling the escort drone 15 to navigate to a summoning individual's location according to desired outcomes such as preserving battery life and avoiding obstacles, for example. The processor 76 may be coupled to a motor control unit 82 configured to manage one or more motors that drive the rotors 83 of the escort drone 15. The necessary motor(s) and rotors on the escort drone 15 can be considered part of the powered movement component 77 of the escort drone 15. The escort drone 15 can also include a GPS receiver 75 configured to receive GPS signals from positioning satellites and determine geographic coordinates from those signals.

In various embodiments, the escort drone 15 is provided as a multirotor unmanned aerial system (UAS) with navigation, such as Real-time Kinematic (RTK) GPS navigation, for example. The multirotor UAS can contain RTK GPS hardware that communicates to an RTK base station to provide centimeter-level positioning accuracy. The escort drone 15 can further be provided with a gimbal-controlled spotlight 32 as noted herein, where the spotlight can be powered and aimed by a gimbal control unit. The gimbal controls can be manipulated by an RSO 42 as described elsewhere herein or autonomously controlled by tracking algorithms stored as part of the programming associated with the escort drone 15, drone enclosure 20 and/or server 40 of the system 10, for example. It will be appreciated that the camera 22 can be secured to the device and also controlled and aimed by the gimbal control unit. The escort drone 15 can also be provided with multirotor avionics such as RF telemetry and the processor 76 can be employed for flight control. It will be appreciated that the hardware and software can be secured to the escort drone 15 in suitable positions to facilitate operation of each attachment.

In accordance with certain embodiments, the escort drone 15 can be outfitted with commercial collision-avoidance sensors 79 and software (e.g., as part of navigation component 80) in case it encounters unexpected obstacles. If something has changed along a static path (e.g., new building construction, etc.) and the collision avoidance maneuver is activated, the escort drone 15 can operate so as to pause a certain distance from the object and autonomously navigate around it. If the collision avoidance maneuver is triggered, the previously defined "obstacle-free" pathway can be updated so that the system learns as it operates. Since collision avoidance operation can be slow, the establishment of obstacle free paths facilitates prompt attention to on-call escort drone operations as described herein.

In various embodiments, one or more cameras (e.g., 22) secured to an escort drone 15 as disclosed herein can be employed for vision-based tracking to exit and land in the drone enclosure 20, navigate to the individual's location using geotagging, identify the individual 44 who summoned the drone, avoid obstacles on the path and follow the individual 44 while avoiding obstacles. Such embodiments can be particularly useful when, for example, GPS is either not available or not accurate enough for precision navigation. It will be appreciated that RTK-GPS is an option for increased navigation precision. However, vision-based navigation is an alternative method for precision navigation. In various further embodiments, the escort drone 15 can employ one or more on-board camera and ranging devices 27 for tracking in order to exit and land in the drone enclosure 20, navigate to the user location using geotagging, identify the individual 44 who summoned it, avoid obstacles on the path and follow the individual 44 while avoiding obstacles. The ranging device 27 can be a lidar device, a laser rangefinder or an acoustic range sensor, for example. It can work in conjunction with the vision sensor to precisely localize the escort drone 15 and execute navigation/tracking tasks.

The escort drone 15 can be summoned in different ways. The drone can be summoned using a software application running onboard a smart device (e.g., 142 in FIG. 4) such as a smartphone or a smartwatch, for example. If an individual 44 cannot quickly access his or her smart device 142 (e.g., if the smart device is stowed inside a backpack or purse), a pushbutton Bluetooth or iBeacon wristband device (not shown) can be activated to trigger the software application running on the user's stowed smart device 142, for example. In some embodiments, the software application can be voice-activated based upon receiving a voice command from the individual 44. Optionally, a tailored RF or WiFi or cellular or GPS beacon can also be used to summon the drone and broadcast the individual's location to the drone.

The software application can initiate a call for an escort drone 15 and broadcast the summoning individual's current location. Once the call is made, the escort summons component 60 of the remote server 40 sends a signal to the appropriate drone enclosure 20 and/or directly to an escort drone 15. Such a signal can be sent via WiFi, cellular network or RF signal, for example. In various embodiments, an RSO 42 or other personnel screens each received summons for an escort drone 15 and approves, disapproves or delays such requests according to established standards and guidelines to ensure appropriate usage. If the signal is transmitted to the drone enclosure 20, the drone enclosure 20 opens the appropriate enclosure door, activates the escort drone 15 and instructs the escort drone 15 to proceed to the individual's summoned location, which can be determined by GPS methodologies, cellular-based localization, or RF beacon. The processor of the remote server 40 can query its database and compute at least one optimal, obstacle-free travel path such as by flight path component 62, for example, to the GPS location of the summoning individual or the individual for whom the escort drone 15 has been summoned. The initial navigation path is then provided from the remote server processor to the escort drone 15 via RF telemetry link or cellular connection, for example. In various embodiments, the escort drone 15 travels autonomously to the individual's location. In other embodiments, the escort drone 15 travels under the control of an RSO 42 to the individual's location. In still other embodiments, the escort drone 15 travels autonomously to or near the individual's location and then control of the escort drone 15 is transferred to an RSO 42. The RSO 42 may choose to engage one or more threat deterring devices 21 secured to the drone 15 as described elsewhere herein. Likewise, the individual 44 may choose to engage one or more threat deterring devices 21 secured to the drone 15 using the software application.

Figure 3:
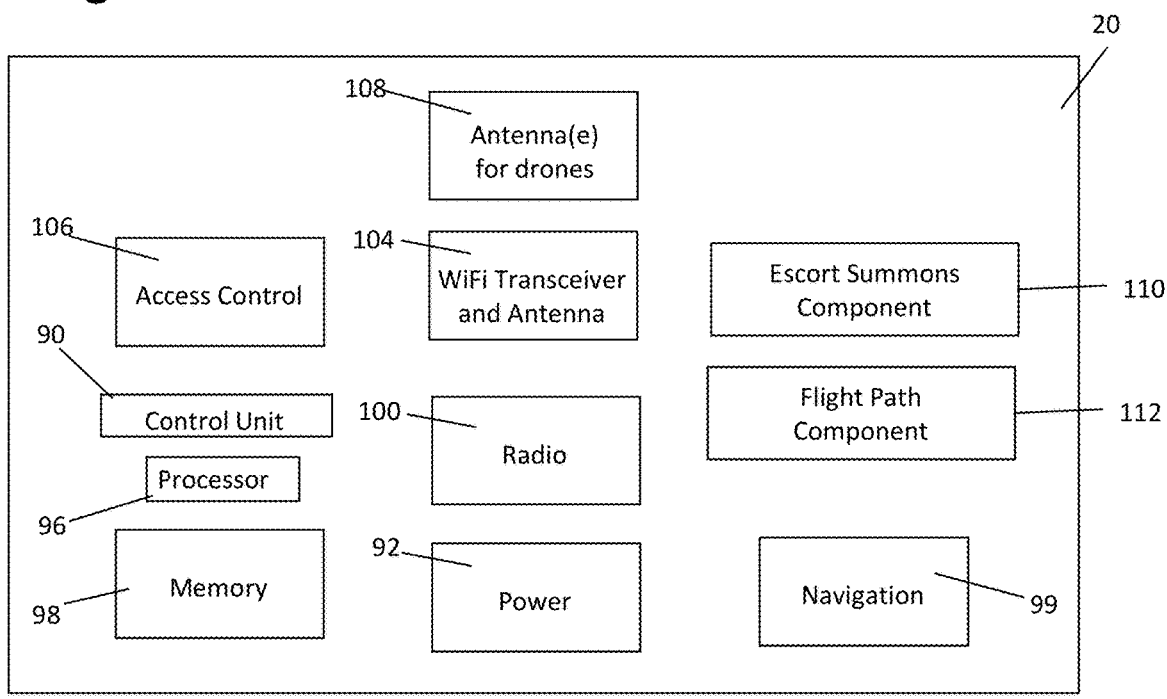
FIG. 3 is a block diagram of components of an escort drone enclosure according to embodiments of the present disclosure.

With reference to FIG. 3, the drone enclosure 20 can include a processor 96, a memory 98 and a control unit 90, with provisioning for power 92 such as a battery and/or a charging pad, and a radio 100 for receiving signals from the remote server 40 and/or for communicating with a radio 74 on one or more escort drones 15, for example. The memory 98 stores instructions that when executed by the processor 96 perform functions and routines as described herein. For example, as with the escort drone 15, navigation programming 99 can be provided with the drone enclosure programming enabling the drone enclosure 20 to safely and successfully navigate a path for an escort drone 15 to a summoning individual's location so as to preserve battery life and avoid obstacles, for example. The processor 96 may also be coupled to a WiFi or cellular transceiver and antenna 104 and an access control unit 106 for opening and closing drone enclosure door(s) when releasing and permitting access to an escort drone 15, for example. The radio 100 and WiFi or cellular transceiver and antenna 104 can facilitate different modes of communication with various actors (e.g., 42, 44), devices (e.g., 15, 200) and server 40 of the system. The processor 96 may further be coupled to one or more antennae 108 for communicating with escort drones 15 using the drone enclosure 20 as a base for operations. In various embodiments, the drone enclosure 20 includes an escort summons component 110 and a flight path component 112 locally onboard rather than relying on similar components provided as part of the remote server 40. In such embodiments, the escort summons component 110 and flight path component 112 perform operations similar to the operations performed by the components 60, 62 on the remote server 40.

The drone enclosure 20 can operate as the charging station for one or more escort drones 15 and central data processing for escort drone activities related to the escort drones 15 housed therein. The control unit 90 can receive video, audio, and telemetry data from one or more escort drones 15 and send audio data, camera and spotlight gimbal controls, and flight commands to the escort drone 15. In various embodiments, the drone enclosure 20 can act as an RTK GPS base station to sync with the RTK GPS system, respectively, on the multirotor, when the escort drone 15 is adapted as such. The drone enclosure 20 can further be provided with an autonomous drone charging unit that automatically charges the escort drone batteries when the landing gear engages with the charging pad, a ventilation and heating system to provide a climate-controlled environment and a door or doors. The door can be hinged, sliding or provided as roof bay doors that are controlled by an electrical actuator to open and close the doors, for example. In various embodiments, the bay doors open when an individual's request is received, close once the GPS reported drone distance indicates the escort drone 15 has exited, open once the GPS reported drone distance indicates the escort drone 15 has returned and closed once the charging station indicates the escort drone 15 has landed.

It will be appreciated that the local control unit 90 can communicate flight commands, audio data, audio control, camera control, spotlight control, security light, siren control and other threat deterrence component control to the escort drone 15 and can receive the corresponding signals back from the escort drone 15 using a commercial RF telemetry link or cellular network, for example. Also, in various embodiments, the drone enclosure processor 96 is directly connected to local remote control unit 90 over either a WiFi network, cellular connection or a wired connection such as a serial connection. The drone enclosure processor 96 uses a cellular or WiFi network connection, for example, to continuously scan the remote server 40 for user escort request directives. The drone enclosure processor 96 receives the individual's escort request and the individual's device GPS location. The drone enclosure processor 96 queries its database and computes at least one optimal, obstacle-free travel path such as by flight path component 112, for example, to the GPS location of the individual's device 142. The initial navigation path is then provided from the drone enclosure processor 96 to the local RF control unit 90. The local control unit 90 then provides the initial navigation path to the escort drone 15 via RF telemetry link or cellular connection, for example. At such time, the roof bay doors or other similar structure of the drone enclosure 20 open and the escort drone 15 exits and navigates to the individual's location. If and when the individual's location changes prior to the escort drone's arrival (at least to the general area of the individual 44), the above-described processes of computing an optimal travel path and communicating to the local control unit 90 are repeated to provide the escort drone 15 with updated navigation paths in real-time. Such paths can include collision-avoidance paths as disclosed elsewhere herein. Once the escort function is completed, the escort drone 15 can autonomously navigate back into the drone enclosure 20 to charge and the roof doors close.

The drone enclosure 20 can include a battery management unit to charge the battery of the escort drone(s) 15 when stowed within the drone enclosure 20, according to various embodiments. While conventional GPS location detection can be employed, in various embodiments, the drone enclosure 20 can include a real-time kinematic (RTK) GPS base which allows the escort drone device 15 to navigate with centimeter-level precision to enter and exit the drone enclosure 20 and land on a charging pad within the drone enclosure 20, for example. As disclosed elsewhere herein, once the escort drone 15 exits the drone enclosure 20, the doors can close automatically based on proximity of the escort drone 15 as measured by the GPS unit. Upon returning, the drone device 15 can use onboard conventional GPS or high precision RTK GPS to accurately navigate back into the drone enclosure 20 through the doors. In embodiments, the bay doors open automatically once the escort drone 15 is within proximity measured by the GPS unit, a Bluetooth™ signal or an infrared broadcast signal. The hatch doors close again once the escort drone 15 lands. In different embodiments, the escort drone 15 lands on a charging station within the drone enclosure 20 that automatically starts charging the drone battery once the landing gear establishes a physical connection with the charging pad.

Escort drones 15 according to the present disclosure can fly above the individual 44 discretely, while providing a real-time audio/video feed to an RSO 44 via drone enclosure 20 and/or server 40. Among other things, the RSO or individual can activate the security lights 30, spotlight 32, siren 28 and/or physical deterrents 33 as necessary to provide greater illumination, loud sound or physical objects in an effort to deter a potential threat scenario.

According to embodiments, the escort drone 15 can travel to the user's location using optimal travel paths that deliver the drone to the user's location in the shortest time possible while avoiding obstacles. Such optimal travel paths can be derived using software programming associated with flight path component 62 or 112, stored mapping information and other information such as building heights, natural obstacles and other information (for example, accessed from a GIS database). The obstacle-free travel paths can be derived for various operating regions, such as an urban neighborhood, college campus or public parking lot, for example. Such information and programming can also be stored in a navigation component and/or database 99 such as shown in FIG. 3, for example. When the individual's request is received, the drone enclosure uses an optimization algorithm to search the database for the optimal path to reach the GPS coordinates.

Figure 4:
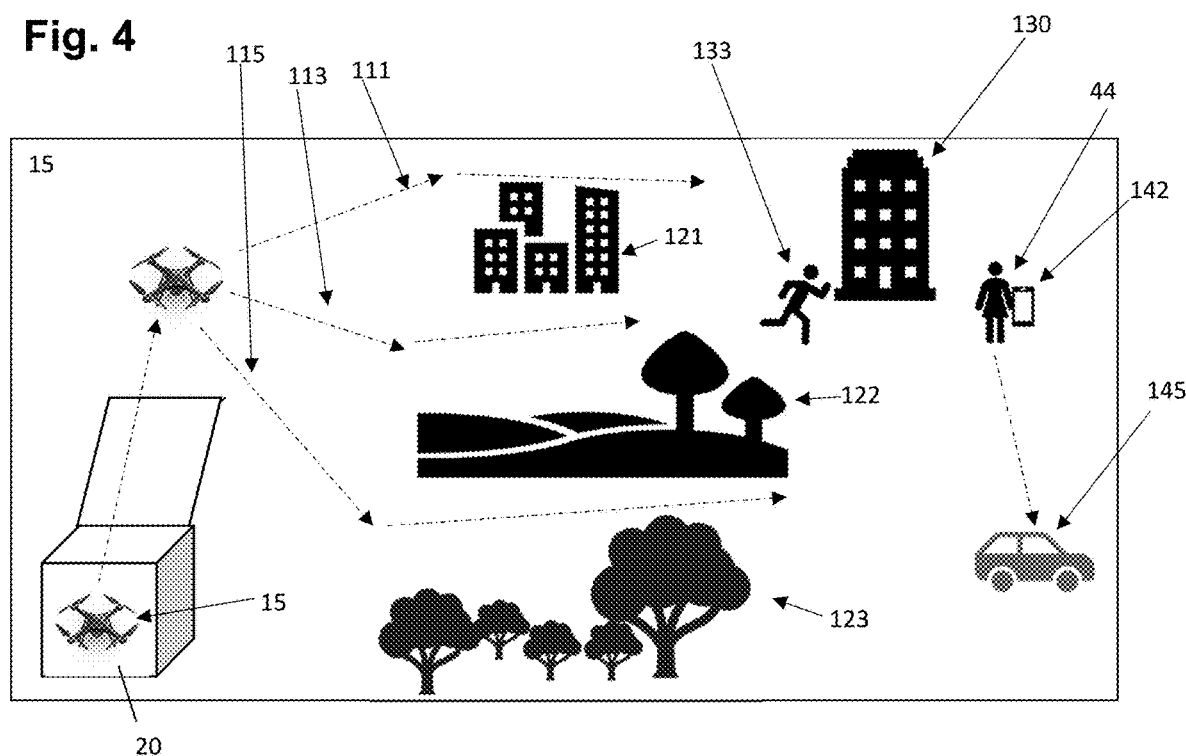
FIG. 4 is an illustration of alternative operations of an escort drone in accordance with embodiments of the present disclosure.

FIG. 4 provides an illustration of multiple available paths 111, 113, 115 for an escort drone 15. Based on circumstances and programmed instructions, the escort drone 15 may be directed along path 111 over buildings 121, path 113 through a park 122 or along path 115 over a wooded area 123 to arrive at a location where the individual 44 who summoned the escort drone 15 is located. The individual 44 may summon the escort drone 15 using mobile communications device 142, which can take many forms, including a smartphone, tablet, watch, beacon or other device. As described elsewhere herein, the escort drone 15 may be scheduled in advance, such as when the individual 44 is planning to leave an establishment such as building 130 to walk to the individual's vehicle 145, or the escort drone 15 may be summoned based on a perceived threat situation, such as the presence of another individual 133. As also described elsewhere herein, the escort drone 15 may autonomously transport itself to the location of the individual 44, may be controlled by an RSO 42 who manually transports the escort drone 15 to the location of the individual 44, or may autonomously transport itself some portion or all of the distance from the escort drone's original location to the location of the individual 44, whereupon control of the escort drone 15 is transferred to an RSO 42 who may direct further movement of the escort drone 15 along with threat deterring elements 21 as described herein. The drone enclosure 20 can, in specific aspects, provide a manual command and control hub to connect the RSO 42 with the escort drone 15 to send flight control commands, telemetry data, audio data or commands, visual data, and to engage the security lights 30, spotlight 32, siren 28 and other threat deterring elements 21. In other cases, the RSO 42 communicates directly over cellular network (e.g., 35) to escort drone(s) 15 via server 40. In cases that warrant such action, the RSO 42 can manually crash the escort drone 15 into an assailant or nearby object. The RSO 42 can also use the escort drone 15 to maintain open two-way communication to the individual 44 who summoned the escort drone 15. Visual tracking algorithms can also be used to facilitate autonomous following of the individual 44. This can provide auxiliary support to the RSO's operation. Path information for the travel of the escort drone 15 can be communicated in real-time between the drone enclosure and the escort drone.

Depending upon the particular scenario and desired operation, the escort drone 15 can continue to follow the individual 44 until the threat or perceived threat is ended. The individual 44 can end the drone engagement by visual or audio acknowledgement to the RSO 42 or by communicating with a suitable application on the individual's device (e.g., 142), for example. When the threat scenario is ended, the escort drone 15 returns to the drone enclosure 20. The RSO 42 can control the escort drone 15 to increase the altitude until it is clear of obstacles, then the escort drone 15 can autonomously navigate back to the drone enclosure 20 in accordance with embodiments of operation. The escort drone 15 can also navigate back to the drone enclosure 20 with no user/RSO input in accordance with embodiments of operation.

According to certain embodiments, the system can include a return to home (RTH) function to be activated if battery life in an escort drone 15 falls below a certain level. The RSO 42 can communicate this information to the individual 44 so that the individual 44 is aware that the escort drone 15 may depart the individual's area. For exceptionally long escort operations, a replacement escort drone 15 can be dispatched to the individual's location to replace the primary escort drone 15 that ran low on battery. The replacement escort drone 15 (which may be controlled by a separate RSO 42, for example) would overlap the primary escort drone 15 so that there is no disruption in the escort function. If there is more than one escort drone 15 available, and if a separate security threat with a higher priority is identified by the system 10, one escort drone 15 could be diverted to follow a criminal or more serious threat as long as another escort drone 15 remains with the individual 44. Once the individual 44 indicates that he or she no longer require the escort drone 15, then the escort drone 15 could be re-purposed assuming sufficient battery life.

Figure 5:
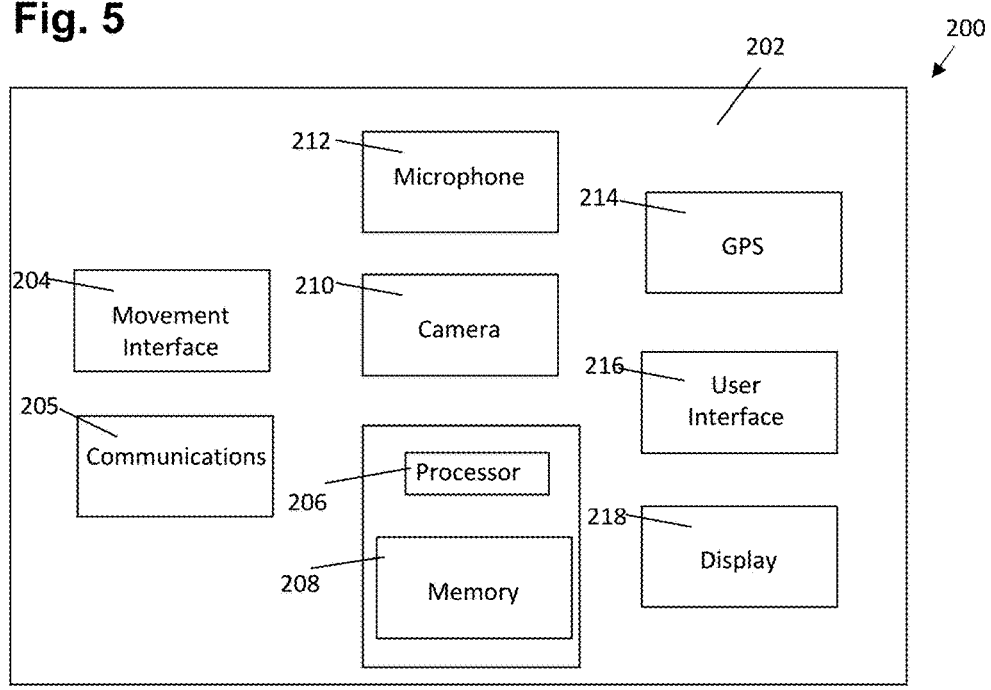
FIG. 5 is a block diagram of components of a drone control device according to embodiments of the present disclosure.

As shown in FIG. 5, for the processes of RSO monitoring and control, the RSO 42 can be provided with a drone control unit 200 including a smart device 202 (e.g., tablet computing device) connected to a movement interface 204 such as a joystick, for example, and a cellular antenna/amplifier and/or other communications component 205. The RSO drone control unit 200 is further provided with a processor 206 (also called control unit processor) and a memory 208 (also called control unit memory) storing instructions that when executed by the processor 206 perform functions and routines as described herein. The RSO drone control unit 200 can utilize a cellular or WiFi modem (e.g., 205) to connect to the remote server 40 in order to transmit control commands and data with the drone enclosure 20 or directly to the escort drone(s) 15. The drone enclosure processor 96 can transmit the RSO control and/or data communication to the escort drone 15 via processes described above in connection with escort drone summons operations, for example. The RSO drone control unit 200 continuously scans the remote server 40 for individual escort request directives. Once an escort request is received, the RSO 42 can execute suitable programming to link to the escort drone 15 via the drone enclosure processor 96, as noted above. The RSO 42 is a user of the drone control unit 200. It will be appreciated that the RSO drone control unit 200 may optionally include a camera 210, microphone 212, GPS transceiver 214, other user interface (e.g., touchscreen, keyboard, mouse) 216 and a display 218. It will further be appreciated that an individual's device (e.g., 142 in FIG. 4) can include the same elements 202-216 as in drone control unit 200 in various embodiments. For example, in embodiments whereby an individual 44 summoning a drone escort 15 desires and is capable of controlling the escort drone 15 directly via the individual's device 142, the individual 44 may actually assume the role of the RSO in controlling the escort drone 15, its movements and its threat deterring components. It will be appreciated that the RSO drone control unit 200, the drone enclosure 20 and the escort drone 15 can be in different locations at the same time, thereby permitting the RSO 42 to use the drone control unit 200 at a first location that is remote and different from a second location where the drone enclosure 20 is located. Further, while one or more escort drones 15 may be co-located with the drone enclosure 20 when not in use, one or more escort drones 15 may also be in a third location that is remote and different from the first and second locations where the drone control unit 200 and drone enclosure 20 reside, respectively. In embodiments, the system 10 can operate whereby a first individual uses a communications device at a first location to summon an escort drone from a drone enclosure at a second location to bring the drone to a third location where another individual is located and where the first individual perceives some potential threat to the second individual. In such instance, the first individual location, the drone enclosure location and the RSO drone control unit location can be different locations, and further the escort drone location can be directed to the second individual at another still different location. It will be appreciated that the locations of the individuals can change over time as the individuals move around in the course of their daily activities.

According to certain embodiments, the RSO 42 can use the system and remote server 40 to override the escort drone's autonomous processes or to engage the security features and/or threat deterring elements 21. The RSO 42 also uses the system to monitor the escort drone's camera views. In various embodiments, multiple cameras are provided, including a first camera, which may be a First Person View (FPV) camera that looks forward in the direction the drone is navigating, and a second camera that may be a gimballed camera that looks down towards the individual. The cameras can be controlled via the system, the RSO 42 and in some cases, the individual 44. As necessary, the RSO 42 can override the autonomous drone navigation utilizing the movement interface (e.g., joystick) controls 204. In various embodiments, the RSO 42 can manipulate the gimballed camera to focus on the individual 44 and their surrounding area. In specific embodiments, a gimballed spotlight on the escort drone 15 can be employed and arranged so as to mimic the point direction of the gimballed camera, such that the RSO camera control is simultaneously spotlight control. In specific embodiments, the gimballed spotlight 32 can be independently controlled to the gimballed camera. Optionally, the RSO 42 can utilize the system 10 to initialize an algorithm to execute vision-based autonomous individual tracking with the gimballed camera. It will be appreciated that the RSO 42 can broadcast live audio commands or pre-recorded audio commands through the escort drone's loudspeaker 26 via the system 10. In various embodiments, programming on the RSO control device 200 is mated to programming on the individual's smart device (e.g., 142), such that the RSO 42 can communicate directly to the individual's smart device 142. If the RSO 42 monitoring indicates an escalation from a perceived threat to an emergency, the RSO 42 can contact emergency services (e.g., 46), for example.

In various embodiments, a pool of RSOs can operate to facilitate escort drone services over a large network of individuals 44 and geographic areas. Each RSO 42 in the pool can be provided with access credentials for logging in to the system 10 to respond to escort drone requests. It will be appreciated that audio and video data from each escort drone 15 can be saved into one or more databases to provide information to law enforcement and other organizations, as necessary.

Figure 6:
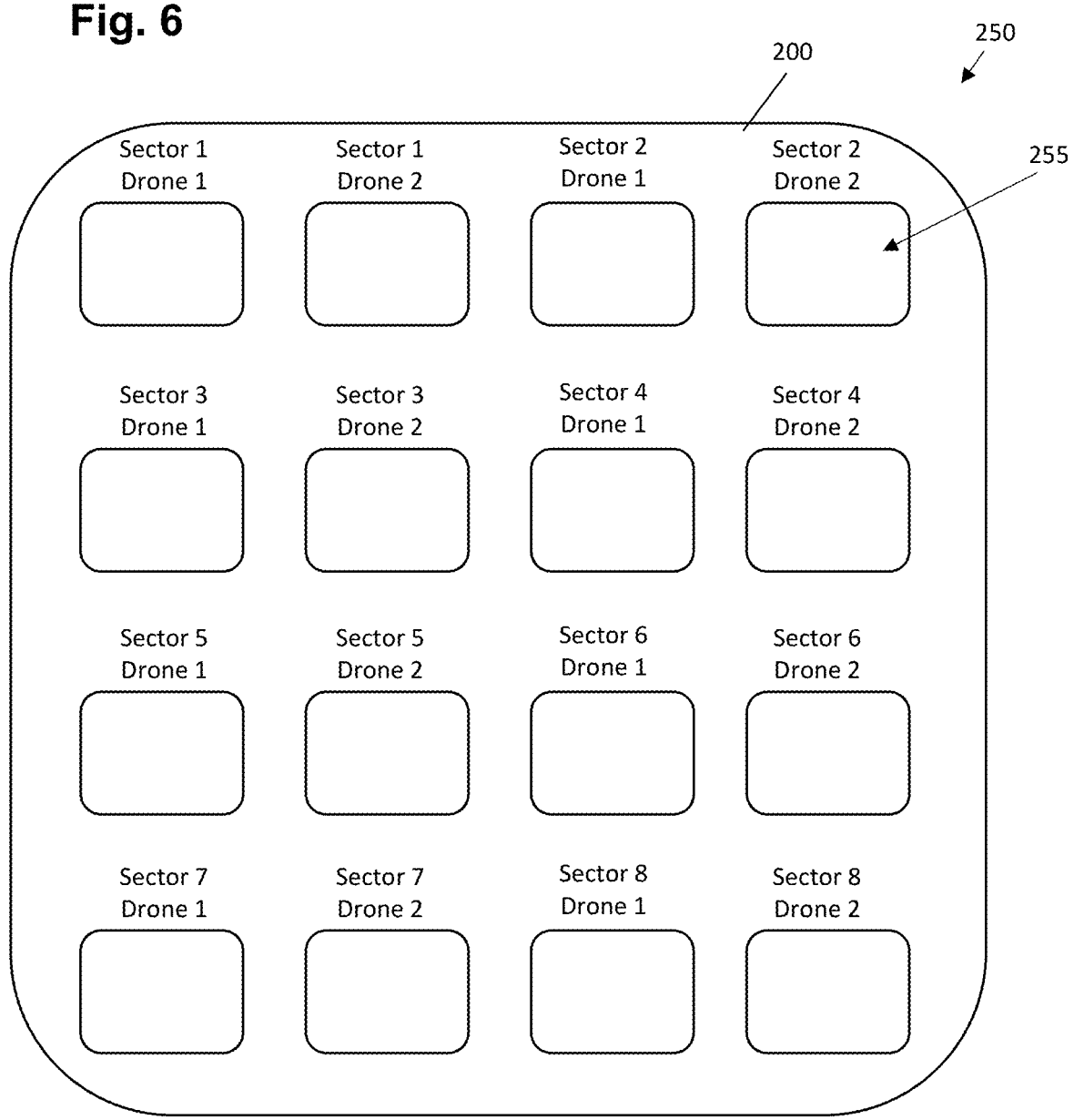
FIG. 6 is an illustration of an exemplary user interface according to embodiments of the present disclosure.

In various embodiments, multiple escort drones 15 are employed as part of a system of drones, with one or more RSO operators 42 monitoring the escort drones 15 and assuming control of the one or more escort drones 15 in defined or ad hoc circumstances. In such embodiments, the escort drones 15 operate semi-autonomously so that a single RSO operator 42 can monitor many escort drones 15 simultaneously. FIG. 6 shows an example display 250 for an RSO device 200 whereby a single RSO 42 can monitor activity of two escort drones in each of eight sectors within a larger environment, wherein the camera view of each escort drone 15 is shown in a window (e.g., 255). The drone camera and software can be used to identify potentially threatening scenarios in order to alert the RSO operator 42 to pay attention to that drone's specific video feed and/or automatically engage deterrence measures. In other embodiments, an individual 44 can signal the RSO 42 for attention through a mobile application or other signaling device as disclosed herein. For example, if the RSO 42 senses a need to assess further information for escort drone Two in sector Two, the RSO 42 may select window 255 using the RSO device user interface (216 in FIG. 5) and thereby receive audio feedback associated with drone Two in sector Two, assume control of movement of this specific escort drone 15 and otherwise receive feedback and cause escort drone action as described elsewhere herein. In various embodiments such as described above, the individual 44 under surveillance can also cause the escort drone 15 to engage deterrence measures without the RSO operator's assistance.

In various embodiments, escort drones 15 as described herein can contain an emergency parachute in case of operational failure to minimize risk to people or property. Further, escort drones 15 as described herein can contain redundant propulsion capability to maintain flight if a propulsor fails. If a propulsor and/or rotor fails, the drone 15 will navigate to land on the roof of the nearest building, for example. During the emergency descent, the vision-based navigation system as described herein can actively search for open-roof space to execute an emergency landing. Further, in various embodiments, upon receiving the summoning individual's location, the system elements (e.g., flight path component 62 and/or 112) can develop a flight trajectory that minimizes risk to people or property while traveling to the individual's location as quickly as possible. This can include flying over buildings (e.g., path 111 in FIG. 4) instead of walkways/roadways (e.g., paths 113 and 115 in FIG. 4), and avoiding areas known to have high density foot traffic based on the time of day, for example. The flight trajectory and/or the first path to be employed can be generated based upon the presence or lack of ground objects between the departing location (i.e., the original location) of the escort drone and the location to which the escort drone is traveling. The presence or lack of ground objects can be determined according to mapping features stored in the system and/or available through outside services 46.

It will be appreciated that the system as described herein can employ intelligent mesh networking to allocate the closest escort drone 15 to the individual's location. The mesh networking can be used to optimize resources between escort drones 15 in different geographic sectors based on availability, battery charge level, and distance to the individual 44, for example. It will be appreciated that escort drones 15 can be housed and operate within distinct sector boundaries. For example, there may be pair-groupings of escort drones 15 in each sector associated with a field of service, as illustrated in FIG. 6. As a specific example, an environment may have eight geographic sectors and a bank of escort drones can be provided for the full environment, with two or more escort drones assigned to each geographic sector within the environment. In each sector, one escort drone 15 can always be available while the second (and any additional escort drone) is charging. For example, if a first individual 44 in Sector Four submits a request, the charged Sector Four escort drone 15 will respond. If a second individual in Sector Four submits a request while the charged/first Sector Four escort drone is servicing the first individual, then remote server 40 and/or the drone enclosure 20 can determine to send either a fully-charged escort drone 15 from a nearby sector (e.g., Sector Three or Sector Five) or the partially-charged second drone from Sector Four. In various embodiments, the escort drone allocation routine can be based on the distance of each escort drone 15 to the individual 44, and/or the escort drone power level. In certain embodiments, the system can select an escort drone to travel to the individual's location based upon the escort drone deemed and/or estimated to support the highest power charge level upon arriving at the first location. In this way, regardless of original location, the system employs the escort drone deemed to be capable of maintaining the monitoring of the individual and the individual's location for the longest duration.

The mesh networking is extended throughout the operation and/or service region. If a third individual is located in Sector Three and submits a request but the fully-charged drone from Sector Three is responding to a service request in Sector Four, then the same networking decision is made via software programming to either utilize the partially-charged escort drone 15 in Sector Three or an escort drone 15 with a higher charge level from a neighboring sector (e.g. the partially-charged escort drone 15 in Sector Four). In embodiments, if an escort drone 15 is returning to a drone enclosure 20 from a service mission it can respond to another service request, before returning to the charging station, depending on the amount of battery power remaining. Further, if an escort drone 15 enacts emergency landing procedures during a security/escort mission, the mesh networking according to the present disclosure can dispatch a replacement escort drone 15 using the previously described drone allocation routine which balances power-available to the distance to the individual 44.

In various embodiments, if the escort mission starts to exceed the battery-level required for the escort drone 15 to return to the drone enclosure 20, the mesh network can dispatch another escort drone 15 to hand-off the escort mission using the same allocation routine. If an individual 44 moves into another drone sector during the mission, the escort drone 15 can either continue with the escort mission or hand-off to another escort drone 15 that operates within that sector. If, at the conclusion of an escort mission, an escort drone 15 (e.g., Sector Four escort drone) does not have enough battery power to return to its original drone enclosure in Sector Four, it can travel to the nearest drone enclosure (i.e., base station) 20 to recharge (e.g., Sector Three base station). The Sector Three escort drone in the Sector Three drone enclosure 20 with higher battery power can exit the Sector Three drone enclosure 20 so that the Sector Four escort drone can recharge. The Sector Three escort drone can travel to the Sector Four drone enclosure 20 and become the new Sector Four escort drone. This scenario can occur if, during the escort mission, the Sector Four escort drone followed the individual 44 into Sector Three but a handoff was unavailable, for example.

In various embodiments, more than one escort drone 15 can be summoned and/or sent to a single location. For example, an additional deterrence measure available according to the present disclosure is the ability for an individual 44 to summon an additional escort drone 15 to the individual's location to provide an intimidating force. The additional escort drone dispatch can be controlled by a drone allocation routine as described elsewhere herein. Further, if a hostile actor (e.g., 133 in FIG. 4) commits a crime towards the individual 44 within view of the drone camera, the escort drone 15 can follow the hostile actor 133 to provide location data to authorities. The action of manipulating the escort drone 15 to follow the hostile actor 133 can be conducted by the RSO operator 42. In various embodiments, the system 10 according to the present disclosure is used for community self-policing and the operators are community members. In addition, individuals can summon an escort drone 15 on behalf of other individuals (e.g., 44) if they perceive a threat to the other individual 44 in accordance with additional embodiments. Such operation can be employed, for example, if the second individual did not have access to a device capable of making an escort request.

It will be appreciated that embodiments of the escort drone system 10 can be tied into local law enforcement departments as described elsewhere herein. If a law enforcement officer requires rapid air support, one or more escort drones 15 in accordance with the present disclosure can be dispatched (e.g., by receiving a summons from an outside service 46) to track criminals or provide an "eye-in-the-sky" for police encounters including traffic stops, following a vehicle, or illuminating dark areas where there is a potential threat. The rapid response and the network of RSOs 42 provided according to the present disclosure facilitate law enforcement operations without diverting otherwise committed law enforcement from their primary mission. A police officer could summon an escort drone 15 according to the present disclosure to their current location, for example.

Other environments and scenarios can benefit from the device, system and method of the present disclosure. For example, an escort drone 15 can be applied in other outdoor arenas such as parks and campgrounds for search and rescue. A lost or endangered hiker can summon an escort drone 15 as described herein to their location for help. A person encountering a wild animal (e.g., a bear) can summon an escort drone 15 to disperse repellant spray. A person fearing an impending criminal activity at a large outdoor event can employ the escort drone system as described herein. The presently disclosed system can also be applied for crowd monitoring and/or riot deterrence.

An escort drone 15 according to the present disclosure can also be used on individual private property to provide on-call personal security to family members. For example, children or adults can carry a wristband device while within range of their home. In the event of a perceived threat, the family member can push a button on the wristband device to summon an escort drone 15. For this local distribution case, the drone enclosure 20 is located on the private property and other family members can act as the RSO 42 to provide control and security measures from home or abroad. For example, in the case of a child playing outside unattended, the child could initiate a call to an escort drone 42, the responsible person such as a parent would be notified and could provide monitoring and control through a connected smart device. The parent could take appropriate safety actions and provide situational awareness to emergency personnel. As a further example, if a person 44 walking alone in a given area feels concerned, such individual 44 can summon an escort drone 15. Many other illustrations will be appreciated.

Figure 7:
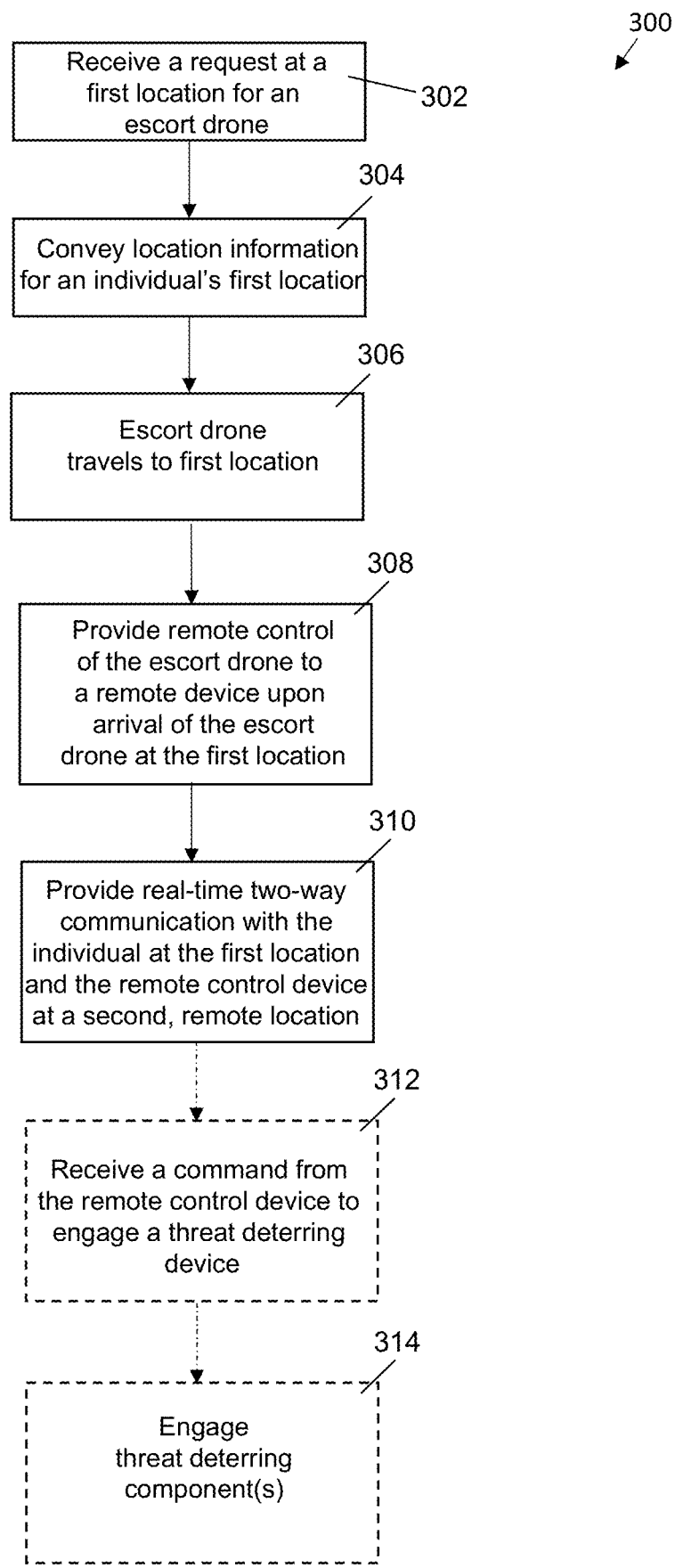
FIG. 7 illustrates an exemplary process flow for a computer-implemented method in accordance with embodiments of the present disclosure.

FIG. 7 is an exemplary process flow diagram 300 for a computer-implemented method in accordance with the present disclosure. As shown therein at 302, a request is received from a mobile communications device for an escort drone. As described elsewhere herein and with reference to FIG. 2, the escort drone 15 can comprise a powered movement component 77 for moving the escort drone 15, a communications component 74 and a payload 19 comprising a camera 22, a microphone 24 and one or more additional threat deterring devices 21. As at 304, location information is conveyed to the escort drone via the communications component 74, wherein the location information pertains to a first location of an individual 44, and whereupon the escort drone engages the powered movement component to travel to the first location as at 306. As at 308, remote control of the camera and the threat deterring device(s) is provided to a remote control device upon the escort drone arriving at the first location. In accordance with the description elsewhere herein and as at 310, the method thereafter provides real-time, two-way communication between the individual 44 at the first location and the remote control device (e.g., 200) via the escort drone 15, wherein the remote control device is at a second location remote from the first location. Such real-time, two-way communication can be via the microphone 24 and/or the camera 22 on the escort drone 15, for example. As at 312, in an optional process as shown in dashed lines, the method involves receiving a command from the remote control device to engage one or more of the threat deterring devices on the escort drone 15, and then at 314, the one or more threat deterring devices are activated and/or engaged by the escort drone. Such process can include activating the loudspeaker or siren, firing pepper spray or even crashing the escort drone as described elsewhere herein.

It will be appreciated that the initial escort drone request can be made by the individual who is to be monitored by the escort drone or by another individual who requests the escort drone for a second individual perceived to have such a need. In such instances, it will be appreciated that the requesting individual may be located at a different location from the location of the individual to be monitored, i.e., the location to which the escort drone travels. It will further be appreciated that remote control of the threat deterring device(s) can be provided to the mobile communications device, such as, for example, in the instance where the individual being monitored believes it is necessary to engage one or more threat deterring devices and wherein the mobile communications device is adapted with controls comparable to those described herein in connection with remote control device 200.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, as exemplified above. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more servers, central controllers, or remote hosts; and/or (b) one or more personal computing devices, such as desktop computers, laptop computers, tablet computers or computing devices, personal digital assistants, mobile phones, and other mobile computing devices. A system as used herein may also refer to: (c) a single server, central controller, or remote host; and/or (d) a plurality of servers, central controllers, or remote hosts in combination with one another. A system as used herein may also refer to: (e) a single server, central controller, or remote host in communication with a drone enclosure, an RSO device and/or an individual's mobile communication device; and/or (f) a plurality of servers, central controllers, or remote hosts in combination with one or more drone enclosures, one or more RSO devices and/or one or more mobile communication devices.

In certain embodiments in which the system includes a server, central controller, or remote host, the server, central controller, or remote host is any suitable computing device (such as a server) that includes at least one processor and at least one memory device or data storage device. The processor of the additional device, server, central controller, or remote host is configured to transmit and receive data or signals representing events, messages, commands, or any other suitable information between the server, central controller, or remote host and the additional device.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

The invention claimed is:

1. A computer-implemented method for monitoring an environment for a perceived physical threat to an individual, comprising:
   receiving a request from a mobile communications device for an escort drone, wherein the escort drone comprises a powered movement component for moving the escort drone, a communications component and a payload comprising a camera, a microphone and at least one additional threat deterring device;
   conveying location information to the escort drone via the communications component, wherein the location information pertains to a first location of the individual, and whereupon the escort drone engages the powered movement component to travel to the first location along a first path, wherein the first path is generated from among multiple path options, wherein the multiple path options comprise a first path option comprising using known geographic data regarding the presence of ground objects between an original location of the escort drone and the first location, a second path option comprising a second path to the first location which uses the least amount of power, and a third path option comprising a third path based upon the lack of ground objects between the original location of the escort drone and the first location;
   providing remote control of the camera and the at least one additional threat deterring device to a remote control device upon the escort drone arriving at the first location; and
   providing real-time two-way communication between the individual and the remote control device via the escort drone, wherein the remote control device is at a second location remote from the first location.

2. The method of claim 1, further comprising receiving a command from the remote control device to engage the at least one threat deterring device.

3. The method of claim 1, wherein the request from the mobile communications device is at the first location.

4. The method of claim 1, wherein the request from the mobile communications device is at a third location remote from the first location.

5. The method of claim 1, further comprising providing remote control of the at least one threat deterring device to the mobile communications device.

6. The method of claim 1 wherein the escort drone is a first escort drone from among a bank of escort drones available to the environment and wherein, upon receiving the request, a determination is made to select the first escort drone from among the escort drones in the bank based upon the first escort drone being closest in proximity to the first location or based upon the first escort drone being deemed to support the highest power charge level upon arriving at the first location.

7. The method of claim 6, wherein the bank of escort drones comprises a plurality of escort drones assigned to each of a plurality of geographic sectors within the environment.

8. An escort drone system, comprising:
   an escort drone, comprising:
      a payload comprising a camera, a microphone and at least one additional threat deterring device;
      a communications component;
      a powered movement component for moving the escort drone; and
      an escort drone processor and an escort drone memory storing escort drone processor instructions that, when executed by the escort drone processor, cause the escort drone processor to perform operations comprising receiving instructions via the communications component over a network for directing operation of the powered movement component, the microphone, the camera and the at least one additional threat deterring device; and
   a remote server comprising a remote server processor and a remote server memory storing remote server instructions that, when executed by the remote server processor, cause the remote server processor to perform operations comprising:
      receiving a request from an individual for the escort drone;
      communicating an instruction for the escort drone to employ the powered movement component so as to be transported to a first location along a first path, wherein the first path is generated from among multiple path options, wherein the multiple path options comprise a first path option comprising using known geographic data regarding the presence of ground objects between an original location of the escort drone and the first location, a second path option comprising a second path to the first location which uses the least amount of power, and a third path option comprising a third path based upon the lack of ground objects between the original location of the escort drone and the first location;

receiving a live video feed from the camera of the escort drone; and responding to a threat perceived by a user of a control unit viewing the live video feed through the control unit, wherein the user is at a second location remote from the first location.

9. The system of claim 8, wherein communicating the instruction to summon the escort drone to the first location comprises sending location information for the first location to the escort drone.

10. The system of claim 8, wherein the payload further comprises at least one of: pepper spray, an animal deterrent spray, a taser, a launched taser dart, or a disabling audio siren.

11. The system of claim 8, wherein the remote server instructions instruct the powered movement component of the escort drone to crash the escort drone.

12. The system of claim 8, wherein the escort drone instructions, when executed by the escort drone processor, cause the escort drone processor to perform operations comprising receiving, from the remote server, a command to yield control of the camera and the at least one additional threat deterring device to the user of the remote control unit.

13. The system of claim 8, wherein the escort drone instructions, when executed by the escort drone processor, cause the escort drone processor to perform operations comprising receiving, from the remote server, a command to yield control of the at least one additional threat deterring device to the individual.

14. The system of claim 8, wherein the escort drone is a first escort drone from among a plurality of escort drones and wherein, upon receiving the request from the individual, the remote server instructions, when executed by the remote server processor, cause the remote server processor to select the first escort drone to be transported to the first location from among the plurality of escort drones based upon the first escort drone being closest in proximity to the first location or based upon the first escort drone being deemed to support a highest power charge level upon arriving at the first location.

15. The system of claim 14, wherein the remote server instructions, when executed by the remote server processor, cause the remote server processor to instruct the first escort drone to be transported to a second location different from the first location and further instruct a second escort drone from among the plurality of escort drones to be transported to the first location.

16. The system of claim 15, wherein the first escort drone and the second escort drone are housed in a drone enclosure at a third location different from the first and second locations.

17. The system of claim 8, wherein the individual is located at the first location, and wherein the first location changes over time based at least upon the movement of the individual.

18. The system of claim 8, wherein the individual is located at a third location different from the first and second locations.

19. The method of claim 1, wherein the escort drone is a first escort drone from among a plurality of escort drones and further comprising:

instructing the first escort drone to travel to a second location different from the first location; and instructing a second escort drone from among the plurality of escort drones to travel to the first location.

20. The system of claim 8, wherein the escort drone is a first escort drone from among a plurality of escort drones and wherein the remote server instructions, when executed by the remote server processor, cause the remote server processor to instruct the first escort drone to be transported to a second location different from the first location and further instruct a second escort drone from among the plurality of escort drones to be transported to the first location.

21. An escort drone system, comprising:

an escort drone, comprising:

a payload comprising a camera, a microphone and at least one additional threat deterring device;

a communications component;

a powered movement component for moving the escort drone; and an escort drone processor and an escort drone memory storing escort drone processor instructions that, when executed by the escort drone processor, cause the escort drone processor to perform operations comprising receiving instructions via the communications component over a network for directing operation of the powered movement component, the microphone, the camera and the at least one additional threat deterring device; and a remote server comprising a remote server processor and a remote server memory storing remote server instructions that, when executed by the remote server processor, cause the remote server processor to perform operations comprising:

receiving a request from an individual for the escort drone;

communicating an instruction for the escort drone to employ the powered movement component so as to be transported to a first location;

receiving a live video feed from the camera of the escort drone; and responding to a threat perceived by a user of a control unit viewing the live video feed through the control unit, wherein the user is at a second location remote from the first location;

wherein the escort drone is a first escort drone from among a plurality of escort drones and wherein, upon receiving the request from the individual, the remote server instructions, when executed by the remote server processor, cause the remote server processor to select the first escort drone to be transported to the first location from among the plurality of escort drones based upon the first escort drone being closest in proximity to the first location or based upon the first escort drone being deemed to support a highest power charge level upon arriving at the first location, and further wherein the remote server instructions, when executed by the remote server processor, cause the remote server processor to instruct the first escort drone to be transported to a second location different from the first location and further instruct a second escort drone from among the plurality of escort drones to be transported to the first location.

* * * * *